Sept. 22, 1964
R. L. HARRINGTON
3,150,367
NON-QUANTIZED CW-FM RADAR RANGING SYSTEM
Filed Dec. 3, 1962
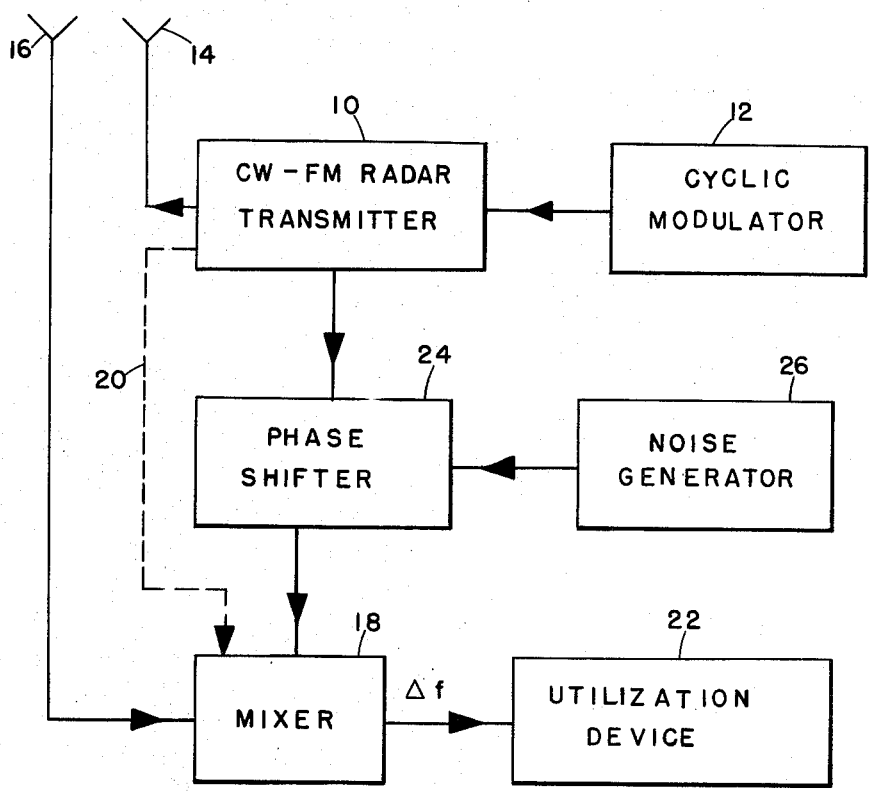
INVENTOR.
ROBERT L. HARRINGTON
BY
*Knox & Knox*

United States Patent Office 3,150,367
Patented Sept. 22, 1964

3,150,367
NON-QUANTIZED CW-FM RADAR
RANGING SYSTEM
Robert L. Harrington, San Diego, Calif., assignor to The
Ryan Aeronautical Co., San Diego, Calif.
Filed Dec. 3, 1962, Ser. No. 241,614
3 Claims. (Cl. 343—14)

This invention relates generally to CW-FM radar ranging systems and more specifically to an improved CW-FM radar ranging system that eliminates the quantization effect inherent in prior art.

Background

Prior art CW-FM radar ranging systems modulate the transmitter with a particular type of periodic signal, such as a triangular or sine wave form. A portion of the transmitter output thus modulated is fed to a mixer in the system receiver where it is heterodyned with the reflected signal. The difference beat frequency, then is amplified and counted in the amplifier-frequency-counter section of the receiver, the output of the frequency counter being an indication of target range. At any given fixed range, the period of the wave form output of the mixer is the same as that of the modulator. Since the number of frequency counts in each period of any signal must necessarily be the same as that in any other period, the frequency count of the range signal must be an integral multiple of the modulating frequency. If the modulating wave form is symmetrical, the range signal also is symmetrical, and the frequency count must be an integral multiple of twice the modulating frequency. This phenomenon is known as the quantizing effect.

Explaining the quantizing effect mathematically, if the transmitted signal is $\cos(\omega t + \theta_0)$, where $\theta$ is triangular wave frequency modulation, the return then is $\cos$ $$(\omega t - \omega T + \theta_T)$$

in which T is the round trip delay time. Mixing the two gives $\cos(\theta_0 - \theta_T + \omega T)$, which is approximately $e(t)$:

$$e(t) = \cos\left[(-1)^n \Omega\left(t - \frac{2n+1}{2}T\right) + \omega T\right]$$

$$nT \leq t < (n+1)T$$
$$n = 0, 1, 2, \ldots$$

where $\Omega$ is the range frequency and $2T$ is the period of $\theta_0$.

The triangular wave frequency modulation $\theta$ is given by $$\theta = \theta(t) = (-1)^n S\left(\frac{1}{2}t^2 - \frac{2n+1}{2}Tt\right)$$

$$nT \leq t < (n+1)T$$
$$n = 0, 1, 2, \ldots$$

in which S is a constant, $t$ is time, and T is the half period of the triangular wave. This is demonstrated by obtaining the frequency by differentation:

$$\dot\theta(t) = (-1)^n S\left(t - \frac{2n+1}{2}T\right)$$

$$nT \leq t < (n+1)T$$

The frequency thus varies according to a triangular function as required and the quantity S is seen to be the slope of frequency with time in radians/second/second.

The difference frequency by heterodyning the transmitted and received waves yields $\cos(\theta_0 - \theta_T + \omega t)$ in which $\theta_0$ is $\theta(t)$ as given above and $\theta_T$ is $\theta(t - \tau)$. Hence, $$\theta_0 - \theta_\tau = \theta(t) - \theta(t-\tau)$$
$$= (-1)^n S\left(\tau t - \frac{2n+1}{2}T\tau - \frac{1}{2}\tau^2\right)$$
$$nT \leq t < (n+1)T$$
$$= (-1)^n (S\tau)\left(t - \frac{2n+1}{2}T - \frac{1}{2}\tau\right)$$

By defining $\Omega \equiv S\tau$ and neglecting the $\frac{1}{2}\tau$ (since ordinarily $T \gg \tau$) then $$\theta_0 - \theta_\tau \cong (-1)^n \Omega\left(t - \frac{2n+1}{2}T\right)$$

$$nT \leq t < (n+1)T$$
$$n = 0, 1, 2, \ldots$$

The expression for $e(t)$ then follows directly.

Extracting the range information depends on determining $\Omega$.

The range frequency can be expressed as $St$ in which S is the constant rate of change of frequency (positive over upsweep, negative over downsweep), and $t$ is the delay time, which is proportional to range. Thus $\Omega$ is proportional to range and has the dimensions of frequency (radians per second). Assuming no doppler shift, the number of zeroes in any half modulation period, i.e., for any $n$, is the same. Therefore, one need consider $e(t)$ during a half modulation period only:

$$e_1(t) = \cos(\Omega t + \omega T)$$
$$0 \leq t < T$$

The number of zero crossings of $e_1(t)$ may change by one, dependent on $\omega T$. For example, suppose that $\Omega = 2.2\pi/T$ and $\omega T$ is $2m\pi$ where $m$ is an integer; $e_1(t)$ has zeroes at $\Omega t = \pi/2$ and $3\pi/2$. If $\omega T$ now changes to $$2m\pi + \pi/2 - \alpha$$

where $0 < \alpha < 0.2$ radians, $e_1(t)$ has zeroes at $\Omega t = \alpha$, $\alpha + \pi$, and $\alpha + 2\pi$. The effect of this phenomenon on a ranging device, commonly called quantization, is that the indicated range jumps one resolution unit each time $\omega T$ changes $\pi$ radians. Thus it is seen that CW-FM radar ranging systems using periodic or cyclic modulation provide range information in integral steps and are not capable of providing continuous range information between steps. This limitation is acceptable at relatively long ranges but becomes serious at short ranges where distances must be indicated in feet.

Objects

It is a principal object of this invention to provide a CW-FM radar ranging system that indicates continuous target ranges.

It is a further object of this invention to provide a non-quantized CW-FM radar ranging system by addition of simple components to equipment well-known to the art.

With these and other objects definitely in view, this invention consists in the novel construction, combination, and arrangement of elements and portions as will be hereinafter fully described in the specification, particularly pointed out in the claims, and illustrated in the drawing that forms a material part of this disclosure, and in which the single figure is a block diagram arrangement of the main components of this invention.

General Description and Theory

The non-quantized CW-FM radar ranging system disclosed herein is identical to the quantized prior art system described above, except that, in the non-quantized system, a phase shifter and noise generator modulator is inserted between the cyclic modulated output of the transmitter and the mixer in the system receiver, as illustrated in the drawing. In this manner, a portion of the cyclic, frequency modulated transmitter output is further modulated with a random, time-varying phase; then heterodyned with the reflected signal in the mixer. The difference beat frequency output of the mixer, then, provides a range signal output that ceases to be periodic and provides a smooth, continuous indication of target range.

Stated mathematically, the phase shifter modulator, as controlled by the noise generator, adds a random phase angle, $\phi(t)$, to $\omega T$, giving for $e_1(t)$:

$$e_1(t) = \cos(\Omega t + \omega T + \phi)$$
$$0 \leq t < T$$

The total phase change in $e_1(t)$ is $\Omega T$. Since the spacing of zeroes is $\pi$ radians, there are at least $k$ zeroes in $\Omega T$ radians, where $k$ is the largest integer less than $\Omega T/\pi$, and at most $k+1$ zeroes.

If the phase interval $\Omega T$ is divided, beginning at one end, into subintervals of $\pi$ radians each, there will be $k$ full subintervals and, in general, a residual which is less than $\pi$ radians. Each full subinterval must contain one zero; the one partial subinterval which contains less than $\pi$ radians, may or may not contain a zero, depending on the beginning phase. Hence, there will be either $k$ or $k+1$ zeroes. If the probability distribution of $\omega T + \theta$ is constant over an interval of $\pi$, and zero elsewhere, the probability of $k+1$ zeroes in $e_1(t)$ is $$P(k+1) = \frac{\Omega T}{\pi} - k$$

and the probability of $k$ zeroes is:

$$P(k) = 1 - \frac{\Omega T}{\pi} + k$$

The expected number of zeroes is:

$$kP(k) + (k+1)P(k+1) = \Omega T/\pi$$

Hence the zero count approaches $\Omega T/\pi$ in each half period of the modulating wave after a sufficient great averaging time, giving a true measure of the range frequency.

It is to be noted that any system employing a counter and a measurable response time is quantized in the sense that the output is proportional to an integer. The difference between prior art quantized systems and the non-quantized system disclosed herein is that in the quantized system the count does not converge to the desired value whereas in the non-quantized system the count does converge.

A basic requirement of the non-quantized system disclosed herein is that the phase angle in $e(t)$ have a rectangular probability distribution. Since there is no restriction on the mean and $\omega T$ ordinarily is some regular function of time, the distribution of $\omega T + \theta$ may be considered the same as that of $\phi$ above. The power spectrum of $\phi(t)$ should fall into a frequency band a decade or so above the readout rate in order to give a sufficiently random sample of phase angles for each readout. At the same time, it should be far enough below the transmitter modulation frequency so that the phase does not change appreciably during any half period at the modulation frequency. Typical values for readout rate, spectrum center of $\phi$, and modulation frequency might be 10, 100, and 1000 c.p.s. respectively.

It would be difficult, if not impossible, to achieve the non-quantizing effect by modulating $e(t)$ directly. Simple phase modulation of the mixer excitation signal, however, produces the proper wave forms. Mixing the reflected signal, $\cos(\omega t - \omega T + \theta_T)$, and the transmitted signal phase modulated with $\phi(t)$, $\cos(\omega t + \theta_0 + \phi)$, yields $e(t)$ in the desired forms: $\cos(\theta_0 - \theta_T + \omega T + \phi)$.

Specific Circuitry Employed in This Invention

Referring to the drawing, CW-FM radar transmitter 10 is modulated by cyclic modulator 12. The frequency modulated signal output of the transmitter is radiated toward the target by directional antenna 14, and the reflected signal is received by directional antenna 16. In prior art CW-FM radar systems the reflected signal is heterodyned in mixer 18 with a sample of the transmitted signal, represented by dashed line 20. The difference frequency, $\Delta f$, then is fed to utilization device 22. Utilization device 22 comprises the amplifier-frequency-counter section of the receiver. This prior art combination of components produces quantized range information wherein the range is measured in steps.

In the instant invention, the transmitted signal sample represented by dashed line 20 is not used. Instead, a sample of the transmitted signal is further modulated by phase shifter 24 before application to mixer 18. Phase shifter 24 phase modulates the transmitted signal sample in random fashion as controlled by noise generator 26. As a result, the output of mixer 18 is a signal at a difference frequency, $\Delta f$, that feeds a non-quantized, smooth and continuous indication of target range to utilization device 22.

It is understood that minor variation from the form of the invention disclosed herein may be made without departure from the spirit and scope of the invention, and that the specification and drawing are to be considered as merely illustrative rather than limiting.

I claim:

1. In a CW-FM radar ranging system containing a transmitter and receiver, the combination comprising:
    means for phase modulation of a sample of the transmitted signal, said sample being a first input to said means;
    means for controlling said means for phase modulation in random fashion, said means for controlling being a second input to said means for phase modulation; and
    means for heterodyning the phase modulated transmitted signal sample with a signal reflected as a result of the transmitted signal striking a target, a first input to the heterodyning means being the output of said means for phase modulation of the transmitted signal sample, and a second input to the heterodyning means being the reflected signal.

2. In a CW-FM radar ranging system containing a transmitter and receiver, the combination comprising:
    a random phase shifter for phase modulation of a sample of the transmitted signal, said sample being a first input to said random phase shifter;
    means for controlling said means for phase modulation in random fashion, said means for controlling being a second input to said means for phase modulation; and
    means for heterodyning the phase modulated transmitted signal sample with a signal reflected as a result of the transmitted signal striking a target, a first input to the heterodyning means being the output of said means for phase modulation of the transmitted signal sample, and a second input to the heterodyning means being the reflected signal.

3. In a CW-FM radar ranging system containing a transmitter and receiver, the combination comprising:
    means for phase modulation of a sample of the transmitted signal, said sample being a first input to said means;
    a noise generator for controlling said phase shifter in random fashion, the output of said noise generator being a second input to said means for phase modulation; and
    means for heterodyning the phase modulated transmitted signal sample with a signal reflected as a result of the transmitted signal striking a target, a first input to the heterodyning means being the output of said means for phase modulation of the transmitted signal sample, and a second input to the heterodyning means being the reflected signal.

No references cited.